United States Patent
D'Aviera

(10) Patent No.: US 7,386,625 B2
(45) Date of Patent: Jun. 10, 2008

(54) METHOD AND SYSTEM FOR PREVENTING THE TRANSMISSION OF PRIVATE INFORMATION OVER A NETWORK

(75) Inventor: Sandro D'Aviera, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1091 days.

(21) Appl. No.: 10/132,402

(22) Filed: Apr. 25, 2002

(65) Prior Publication Data

US 2002/0194358 A1 Dec. 19, 2002

(30) Foreign Application Priority Data

Jun. 19, 2001 (GB) .................. 0115051.5

(51) Int. Cl.
*G06F 15/16* (2006.01)
(52) U.S. Cl. .................................. 709/232
(58) Field of Classification Search ........ 709/217–218, 709/232, 206; 726/11; 715/505, 526
See application file for complete search history.

(56) References Cited

U.S. PATENT DOCUMENTS

| | | | |
|---|---|---|---|
| 5,884,033 A * | 3/1999 | Duvall et al. ............... 709/206 |
| 6,065,056 A * | 5/2000 | Bradshaw et al. ........... 709/229 |
| 6,182,119 B1 * | 1/2001 | Chu ........................... 709/206 |
| 6,421,729 B1 * | 7/2002 | Paltenghe et al. ........... 709/229 |
| 6,438,215 B1 * | 8/2002 | Skladman et al. ......... 379/67.1 |
| 6,604,143 B1 * | 8/2003 | Nagar et al. ................. 709/229 |
| 6,633,915 B1 * | 10/2003 | Hashimoto ................... 709/228 |
| 6,947,396 B1 * | 9/2005 | Salmi .......................... 370/310 |
| 6,950,858 B2 * | 9/2005 | Ogami ....................... 709/217 |
| 7,010,566 B1 * | 3/2006 | Jones et al. ................. 709/203 |
| 2001/0021946 A1 * | 9/2001 | Ogami ....................... 709/217 |
| 2002/0100026 A1 * | 7/2002 | Betros et al. ............... 717/136 |

FOREIGN PATENT DOCUMENTS

EP        0951158 A2   10/1999

* cited by examiner

*Primary Examiner*—Andrew Caldwell
*Assistant Examiner*—Benjamin A Ailes
(74) *Attorney, Agent, or Firm*—Stephen J. Walder, Jr.; Jeffrey S. LaBaw

(57) ABSTRACT

A method (300) and system for preventing private information to be collected and sent to the INTERNET without the consent of a user of a client computer. Every time the user wishes (317) to run a new application program, an isolator engine is invoked (303). The isolator engine intercepts (329) all the output operations (327) of the application program attempting to send messages to the INTERNET. Each message is compared (330-345) with a privacy list storing a series of strings (such the name of the user, his or her private e-mail address); if a match occurs, the user is asked (352) whether he or she desires to continue or abort execution of the application program.

16 Claims, 4 Drawing Sheets

METHOD AND SYSTEM FOR PREVENTING THE TRANSMISSION OF PRIVATE INFORMATION OVER A NETWORK

FIELD OF INVENTION

The present invention relates to a method and system for controlling transmission of information.

BACKGROUND OF THE INVENTION

Transmission of information is a common practice in modern data processing systems, particularly in telematic networks connecting a great number of computers, such as the INTERNET. Security is of the utmost importance in this context; in fact, any computer connected to the INTERNET is prone to be accessed by any other user of the network.

Several techniques have been proposed in the last years for ensuring that information stored in a computer cannot be compromised. For example, anti-viruses inspect programs in order to prevent running of harmful code that could impair operation of the computer. On the other hand, firewalls are designed to prevent unauthorised access to computers of a private network; particularly, all messages entering the private network pass through the firewall, which examines each message and blocks those that do not meet specified security criteria.

Filtering is also used for controlling access to the INTERNET, by analysing incoming and outgoing packets and letting them pass or halting them based on the address of a source or destination, respectively. For example, a bozo list or kill file enables the computer to block all messages from a specified individual; moreover, it is also possible to prevent access to specific web sites from the computer.

However, this scenario is not completely satisfactory. In particular, the inventor has discovered that none of the solutions known in the art is effective in protecting privacy of a user of the computer. As a consequence, the user of the computer is very often spammed with junk e-mail or newsgroup postings, generally consisting of unsolicited advertising for some product. Moreover, the user of the computer may also receive searing messages (generally known as flames) in which a writer attacks him or her in overly harsh, and often personal, terms.

It is an object of the present invention to overcome the above-mentioned drawbacks. In order to achieve this object, a method as set out in the first claim is proposed.

DISCLOSURE OF THE INVENTION

Briefly, the present invention provides a method of controlling transmission of information including the steps of retrieving information stored on a data processing system, attempting to send the retrieved information from the data processing system to a further data processing system, storing an indication of at least one privacy item on the data processing system, verifying whether at least one privacy item matches the retrieved information, and preventing the sending of the retrieved information if the result of the verification is positive.

Moreover, the present invention also provides a computer program for performing the method, a program product storing the program, and a corresponding system.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DESCRIPTION OF THE PREFERRED EMBODIMENT

Figure 1:
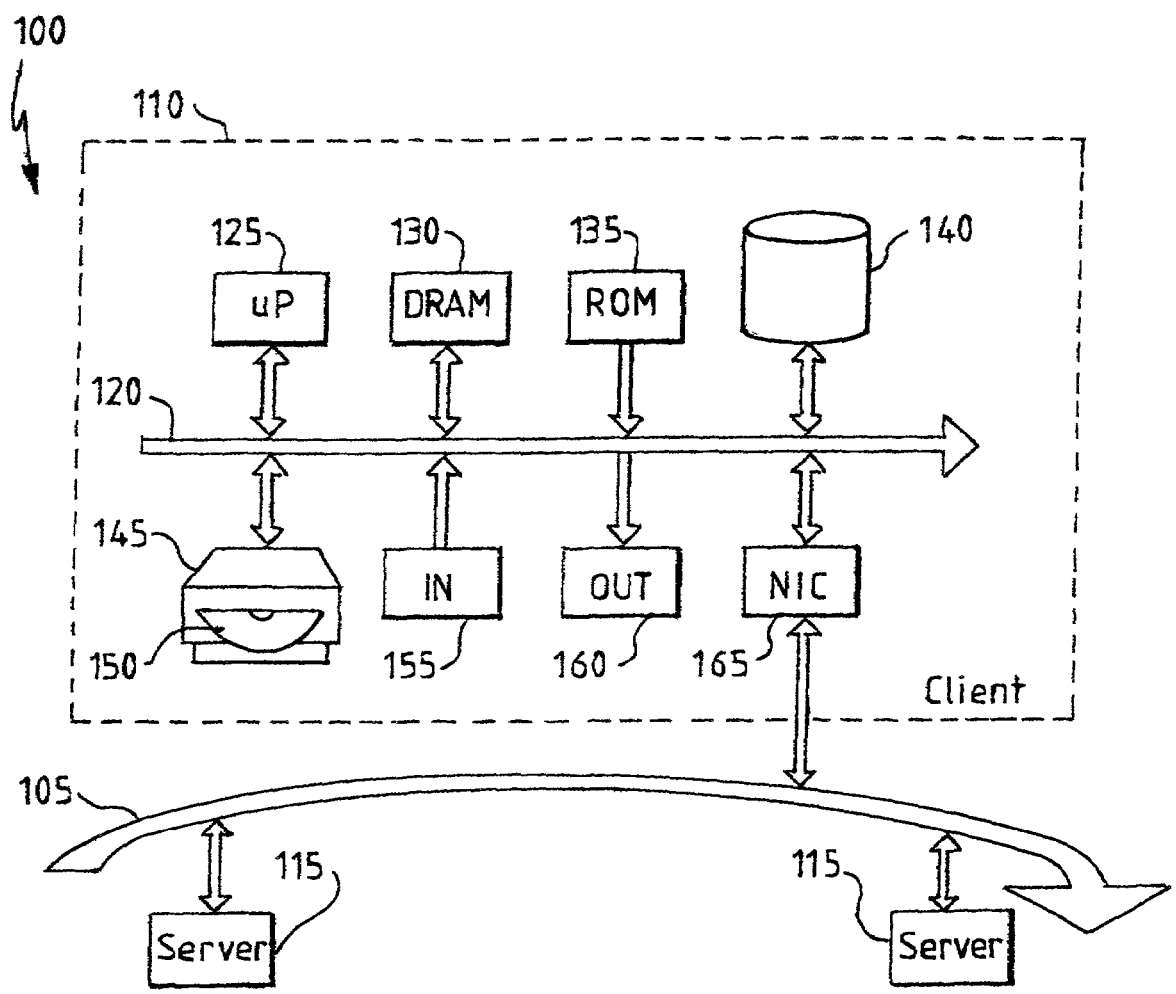
FIG. 1 is a basic block diagram of a data processing system in which the method of the invention can be used.

With reference in particular to FIG. 1, there is shown a telematic network 100, for example consisting of the INTERNET. The INTERNET is a global network with a decentralized design including millions of computers, which are connected to each other through a telecommunication structure 105. A client computer (or workstation) 110 is employed by a user for surfing through the INTERNET. A system of server computers 115 supports shared resources, which are accessed by the client computer 110.

The client computer 110, for example consisting of a Personal Computer (PC), includes several units that are connected in parallel to a communication bus 120. In particular, a microprocessor (µP) 125 controls operation of the client computer 110, a working memory 130 (typically a DRAM) is used directly by the microprocessor 125, and a read-only memory (ROM) 135 stores a basic program for starting the client computer 110. Various peripheral units are further connected to the bus 120 (by means of respective interfaces). Particularly, a bulk memory consists of a hard-disk 140 and of a driver unit 145 for reading CD-ROMs 150; the client computer 110 further includes an input unit (IN) 155, which consists for example of a keyboard and a mouse, and an output unit 20 (OUT) 160, which consists for example of a monitor. A network interface card (NIC) 165 is used to connect the client computer 110 to the telecommunication structure 105, and then to the INTERNET.

Similar considerations apply if a different network is envisaged (such as an INTRANET), if the client computer has a different structure, for example with multiple microprocessors, if the client computer consists of a mini-computer, and the like.

Figure 2:
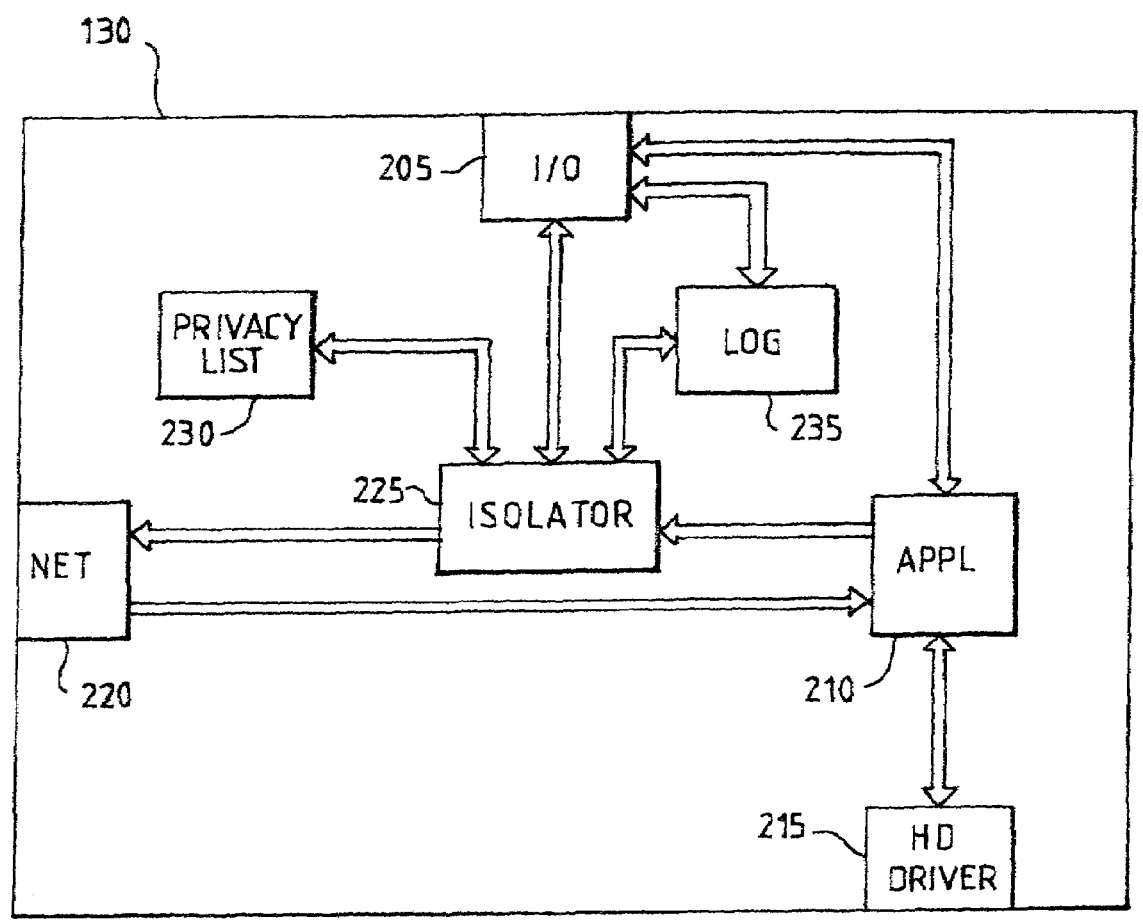
FIG. 2 shows a partial content of a working memory of the system.

Considering now FIG. 2, there is shown a partial content of the working memory 130 of the client computer; the information (programs and data) is typically stored on the bulk memory and loaded (at least partially) into the working memory 130 when the programs are running. Particularly, the programs are installed onto the hard disk from CD-ROM, or they are directly loaded into the working memory from CD-ROM.

The working memory 130 includes an input/output interface (I/O) 205, which is used for exchanging information with the user of the client computer. The input/output interface 205 communicates with an application program (APPL) 210, which is provided on CD-ROM. A hard-disk driver module (HD DRIVER) 215 is used by the application program 210 for accessing information stored on the hard-disk of the client computer. The application program also receives information from the INTERNET through a network module (NET) 220, which processes a set of protocol layers working together for defining communication over the INTERNET. On the other hand, information to be sent to the INTERNET is intercepted by an isolator engine (ISOLATOR) 225, which in turn retransmits the information to the network module 220.

The isolator engine 225 controls a privacy list 230, which consists of a file with multiple records. Each record stores either a string or a query defining corresponding privacy items deemed sensitive by the user of the client computer. For example, the string consists of a name of the user, his or her e-mail address, the name of a file or the path of a folder wherein private information is stored. On the other hand, the query consists of a pattern defined by special symbols (such as "?", replacing one character, or "*", replacing zero, one or more characters), or an instruction written in a specific query language using logic operators (such as AND, OR and NOT). The isolator engine 230 further manages entering of information in a log file (LOG) 235, which is accessed by the user through the input/output interface 205.

Likewise considerations apply if the programs and data are structured in a different manner, if the privacy list includes one or more equivalent items, if the privacy list and/or the log file are replaced by different memory structures, if more application programs are running concurrently on the client computer, and so on.

Figure 3G:
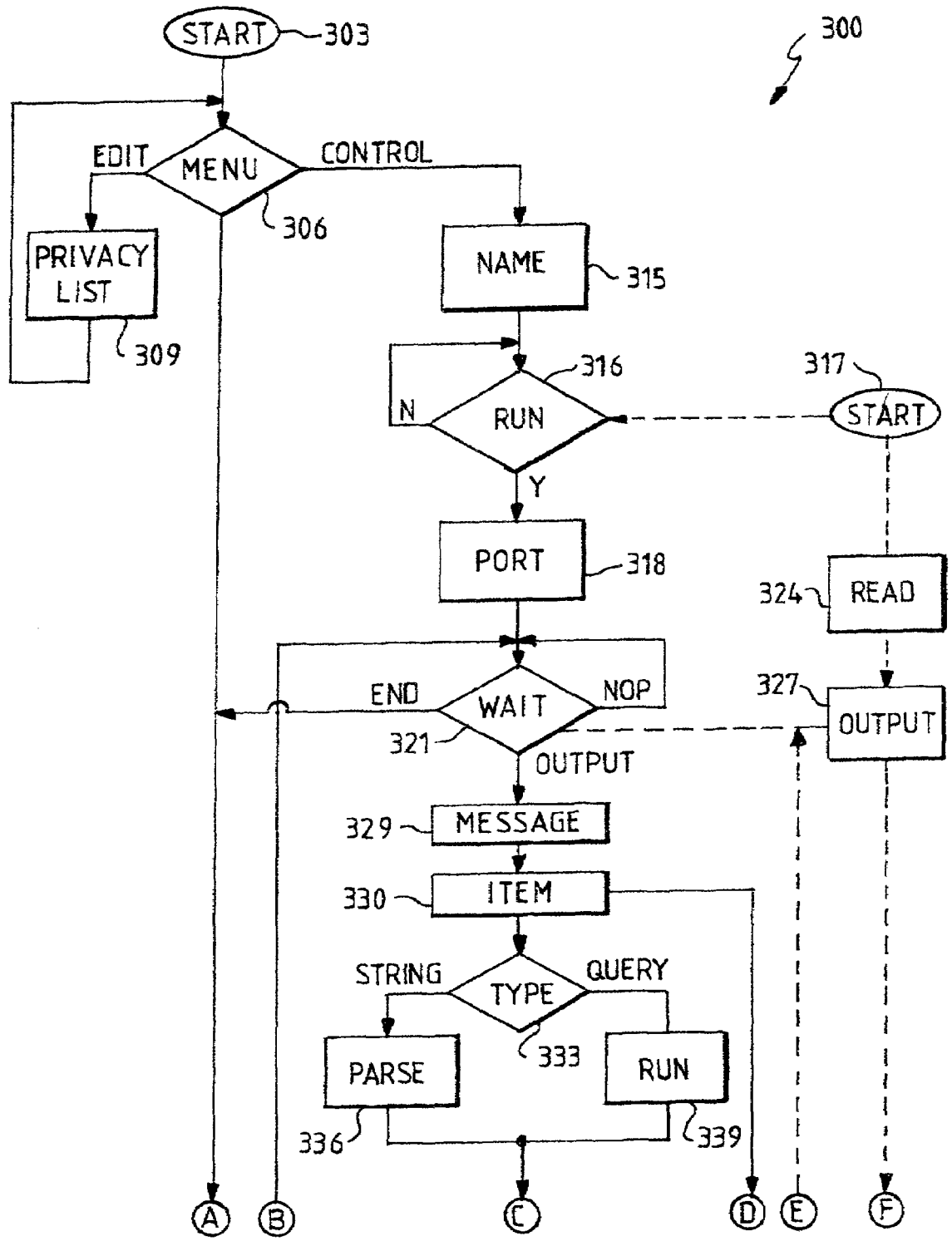
FIG. 3*a*-3*b* are a flow chart of the method implemented in the system.
Figure 3B:
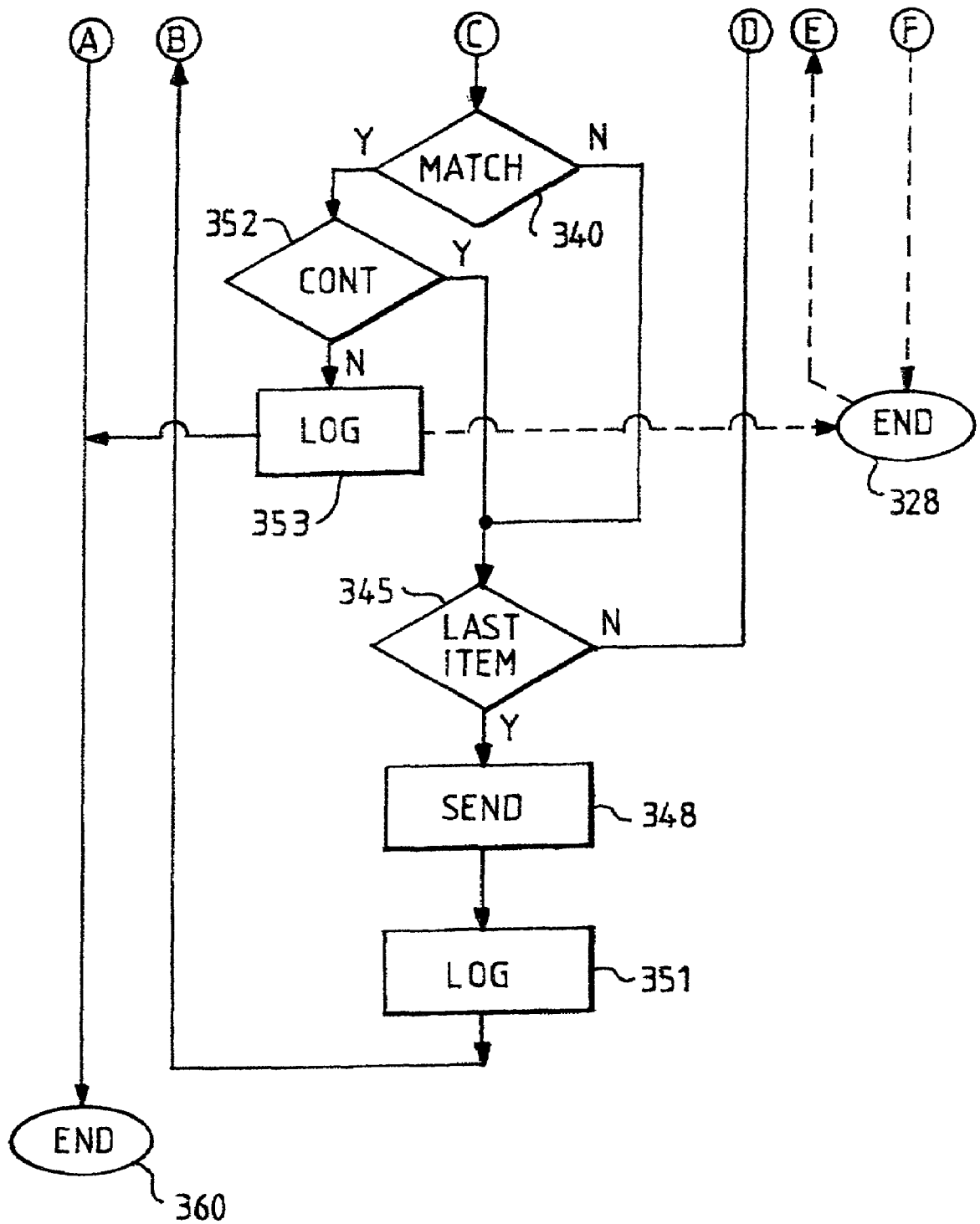

With reference now to FIG. 3a-3b, every time the user of the client computer wishes to control execution of a new application program a method 300 is performed. Particularly, the user starts execution of the isolator engine at block 303, for example with a double click of the mouse on a corresponding icon. The method then passes to block 306, wherein a menu with a series of possible choices is displayed on the monitor of the client computer. The method carries out the operations corresponding to the choice selected by the user. Particularly, if the user has selected the function of editing the privacy list the block 309 is executed, while if the user has selected the function of controlling the application program the blocks 315-353 are executed; conversely, if the user has chosen to exit the isolator engine, the method ends at the final block 360.

Considering block 309 (edit function), the user deletes an item (string or query) from the privacy list, inserts a new item, or updates a selected item. The method then returns to block 309 waiting for a new command from the user.

With reference now to block 315 (control function), the user is prompted to insert the name of the application program to be controlled. The isolator engine then enters an idle loop at block 316, waiting for running of the application program. The user starts execution of the application program at block 317 by inserting the corresponding CD-ROM into the client computer. The isolator engine proceeds to block 318 in response to the starting of the application program, wherein it determines a logical channel (port) used by the application program for exchanging information with the INTERNET; the logical channel is identified by a unique port number (for example 80). The isolator engine then enters a further idle loop at block 321, waiting for an operation of the application program.

In the meanwhile, the application program executes a series of instructions during its processing flow. Particularly, every time information stored on the client computer is to be sent to the INTERNET, the information is firstly retrieved from the hard-disk at block 324; for example, the application program reads a text file, configuration information for the client computer, a cookie, and the like. An output operation for attempting to send a message including the retrieved information to the INTERNET is then carried out at block 327. Once the processing flow has been completed, the application program ends at the final block 328.

Referring back to block 321 (isolator engine), if the application program has terminated its execution the isolator engine ends at the final block 360 in response thereto. On the other hand, if the application program has executed an output operation for sending information to the INTERNET the isolator engine passes to block 329, wherein the output operation is captured using a hooking technique. Particularly, the network module employs a register that determines the port number on which the network module is listening for receiving messages from the application program. This register is set to a different port number (for example 100), which is associated with the isolator engine; at the same time, the isolator engine is configured to listen on the port number used by the application program (80 in the example at issue). In this way, all the messages provided by the application program are received by the isolator engine instead of the network module. This technique allows the isolator engine to intercept all the outgoing messages that the application program attempts to send to the INTERNET, in a manner that is completely transparent to the application program.

Proceeding to block 330, the isolator engine extracts an item from the privacy list (starting from the beginning). The type of the current item is verified at block 333. If the current item is a string the method continues to block 336, wherein the outgoing message is parsed and compared with the string; conversely, if the current item consists of a query the method continues to block 339, wherein the query is run on the outgoing message. On both cases, the method proceeds to block 342, wherein the isolator engine verifies whether the current item matches the outgoing message; more specifically, the isolator engine verifies whether the string is included in the outgoing message or whether the result of the query is not null.

If the result of the verification is negative, the method checks at block 345 whether a last item of the privacy list has been reached. If not, the method returns to block 330 for processing a next item of the privacy list. Conversely, the method passes to block 348, wherein the outgoing message is provided to the network module on the port used by the application program, in order to be sent to the INTERNET. Information about the output operation (such the name of the application program, the outgoing message, and the result of the verification) is saved in the log file at block 351. The method then returns to block 321, waiting for a next output operation of the application program or for its termination.

On the contrary, if the result of the verification carried out at block 342 is positive the isolator engine requires instruction to the user at block 352; particularly, a dialog box is displayed on the monitor of the client computer in order to ask whether the user desires to proceed further in spite of the fact that the current item of the privacy list matches the outgoing message to be sent to the INTERNET. If the response is yes, the method passes to block 345 (for continuing the check of the outgoing message). If the response is not, the method passes to block 353, wherein the isolator engine logs the output operation and aborts execution of the application program that is caused to end at the final block 328; the isolator engine then terminates its execution at the final block 360 as well.

Likewise considerations apply if the isolator engine performs an equivalent method, if the information to be sent to the INTERNET is stored elsewhere on the client computer, if the outgoing messages provided by the application program are intercepted using a different technique, if only a text portion of the outgoing message is verified, and the like.

More generally, the present invention provides a method of controlling transmission of information. The method includes the steps of retrieving information stored on a data processing system, and attempting to send the retrieved information from the data processing system to a further data processing system. An indication of one or more privacy items is stored on the data processing system. The method then verifies whether one or more privacy items match the retrieved information, and prevents the sending of the retrieved information if the result of the verification is positive.

The proposed solution is particularly effective in protecting the privacy of the user from any unknown behaviour of the client computer. This result is achieved with a method that is simple and user-friendly. Particularly, the definition of the items (strings or queries) to be checked does not require any specific expertise; in fact, the privacy list is easy to configure and may be edited directly by an end-user of the client computer, without the intervention of any specialist.

The method of the invention prevents private information about the user to be collected and transmitted to the INTERNET, for example to marketing people of some aggressive company, without the consent of the user. Therefore, the user is not spammed with unsolicited messages, such as advertising; moreover, he or she is substantially protected from searing messages including personal attacks.

The preferred embodiment of the invention described above offers further advantages. For example, the isolator engine intercepts any output operation executed by an application program running on the client computer. Therefore, only programs whose behaviour is not known are controlled, such as the ones provided on CD-ROM in bundle with newspapers that enable the user to try some new e-commerce services free of charge (like accessing quote news or using online translators). This avoids wasting resources for controlling safe programs, such as standard office automation packages. Advantageously, the isolator engine is invoked by the user specifying the name of the application program to be controlled, and its execution terminates with the one of the application program. In this way, the isolator engine runs only when necessary, thereby reducing to the minimum any performance degradation of the client computer.

Likewise considerations apply if the application program is received from the INTERNET, if the application program is identified in a different manner, if the isolator engine is replaced by an equivalent control program, and so on. However, the solution of the present invention leads itself to be carried out even using an isolator engine that must be closed by the user explicitly, implementing the isolator engine with a daemon process, or controlling all the programs running on the client computer by intercepting any message intended to be sent to the INTERNET (irrespective of its origin).

Preferably, the user is asked whether he or she desires to proceed further when an item of the privacy list matches the outgoing message; this feature allows some kind of information generally deemed sensitive to be sent to the INTERNET in specific situations. Moreover, each outgoing message and the respective result of the verification carried out on the privacy list are logged for subsequent analysis.

Similar considerations apply if instructions are requested to the user in a different manner or if different information is stored in the log file. Alternatively, only information about the matches is logged, no information is logged at all or no instructions are required to the user; for example, execution of the application program is always aborted in response to the match of an item of the privacy list with the outgoing message, or the user may specify some items in the privacy list that cause the application program to end its execution and other items that only cause the match to be logged (without affecting execution of the application program).

Advantageously, the privacy list consists of strings that are compared with the outgoing message. This structure is particularly simple, but at the same time very effective. In a different embodiment, the privacy list also includes queries to be run on the outgoing message. In this way, the method of the invention is more flexible and makes it possible to carry out very accurate controls on the outgoing messages (without significantly increasing the complexity of the solution).

Similar considerations apply if different queries are envisaged (such as with proximity operators), if the result of the verification on the outgoing message is deemed positive only when two or more items of the privacy list match the outgoing message, and the like. However, the method of the invention leads itself to be implemented even with a privacy list consisting only of items of a single type (either strings or queries).

In the preferred embodiment of the invention, the method is used for controlling operation of a client computer of a telematic network, such as the INTERNET. However, different applications of the devised solution are not excluded, such as for controlling outgoing messages from a router connecting a private network to the INTERNET.

Advantageously, the solution according to the present invention is implemented with the isolator engine, which consists of a computer program (software) provided on CD-ROM.

Alternatively, the isolator engine is provided on floppy-disk, is pre-loaded onto the hard-disk, or is stored on any other computer readable medium, is sent to the client computer through the INTERNET, is broadcast, or more generally is provided in any other form directly loadable into the working memory of the client computer. However, the method according to the present invention leads itself to be carried out even with a hardware structure, for example integrated in a chip of semiconductor material.

Naturally, in order to satisfy local and specific requirements, a person skilled in the art may apply to the solution described above many modifications and alterations all of which, however, are included within the scope of protection of the invention as defined by the following claims.

What is claimed is:

1. A method of controlling transmission of information including the steps of:
   retrieving information stored on a data processing system,
   attempting to send the retrieved information from the data processing system to a further data processing system,
   storing a plurality of privacy items on the data processing system, wherein the plurality of privacy items includes at least one privacy item comprising a query written in a query language,
   verifying whether at least one privacy item, in the plurality of privacy items, matches the retrieved information, and
   preventing the sending of the retrieved information if the result of the verification is positive, wherein:
   verifying whether the at least one privacy item matches the retrieved information includes verifying whether a result of running the at least one privacy item comprising the query on the retrieved information indicates that conditions of the query are satisfied by the retrieved information, each privacy item in the plurality of privacy items has an associated privacy item type, the plurality of privacy items comprise at least two privacy items having different privacy item types, and verifying whether at least one privacy item matches the retrieved information comprises, for each privacy item in the plurality of privacy items:

determining a privacy item type associated with the privacy item; and performing the verification based on the privacy item type of the privacy item.

2. The method according to claim 1, further including the steps of:

executing an output operation by an application program running on the data processing system for sending the retrieved information to the further data processing system, and intercepting the output operation by a control program running on the data processing system, the control program performing said steps of verifying and preventing.

3. The method according to claim 2, further including the steps of:

starting execution of the control program by a user of the data processing system, providing a name of the application program to the control program, starting execution of the application program, running the application program, terminating execution of the application program, terminating execution of the control program in response to the termination of the application program.

4. The method according to claim 3, further including the steps of:

requesting instructions from the user if the result of the verification is positive, and continuing or aborting execution of the application program according to the instructions.

5. The method according to claim 2, further including logging an indication of each output operation and of the result of the corresponding verification on the data processing system.

6. The method according to claim 1, wherein at least one privacy item, in the plurality of privacy items, comprises a string, and wherein the step of verifying whether at least one privacy item matches the retrieved information includes verifying whether the at least one string is included in the retrieved information.

7. The method according to claim 1, wherein the data processing system is a client computer of a telematic network.

8. The method of claim 1, further comprising:

receiving, from a user, an input identifying an application to monitor for transfers of private information;

determining a first logical channel used by the identified application; and monitoring a transfer of information from the application via the first logical channel, wherein monitoring the transfer of information comprises performing the verifying and preventing steps on information that is a subject of the transfer.

9. The method of claim 8, wherein monitoring a transfer of information from the application via the first logical channel comprises:

redirecting the transfer of information to a second logical channel, different from the first logical channel, corresponding to a control program, wherein the control program performs the verifying and preventing steps in response to receiving the transfer of information via the second logical channel.

10. The method of claim 1, wherein determining a type attribute associated with the privacy item comprises:

determining if the at least one privacy item is one of a string or a query, wherein if the at least one privacy item is a query, the verification step comprises running the query on the retrieved information, and wherein if the at least one privacy item is a string, the verification step comprises parsing the retrieved information to determine if the string is present in the retrieved information.

11. The method of claim 1, wherein preventing the sending of the retrieved information is performed automatically in response to a positive verification that the at least one privacy item matches the retrieved information.

12. The method of claim 1, wherein storing an indication of at least one privacy item on the data processing system comprises:

storing the indication of the at least one privacy item in association with an action identifier that identifies whether the verification being positive results in an application being aborted or results of the verification being logged, wherein, in response to results of the verification, an action is performed based on the results of the verification and the action identifier.

13. The method of claim 1, wherein the query language utilizes logic operators to specify the conditions of the query.

14. The method of claim 1, wherein verifying whether at least one privacy item, in the plurality of privacy items, matches the retrieved information comprises iteratively traversing the plurality of privacy items and applying each privacy item in the plurality of privacy items to the retrieved information and identifying at least one privacy item in the plurality of privacy items that match the retrieved information.

15. The method of claim 1, wherein a privacy item that comprises a query written in a query language is determined to match the retrieved information if a result of running the query on the retrieved information is a non-null value.

16. The method of claim 1, wherein if the privacy item type of the privacy item is a string privacy item type, then the retrieved data is parsed and compared to a string associated with the privacy item, and wherein if the privacy item type of the privacy item is a query privacy item type, then a query associated with the privacy item is run on the retrieved data.

* * * * *